United States Patent [19]
Koch et al.

[11] Patent Number: 5,930,744
[45] Date of Patent: *Jul. 27, 1999

[54] COATING THICKNESS GAUGE

[75] Inventors: Frank J. Koch, Ogdensburg, N.Y.; Leon C. Vandervalk; David J. Beamish, both of Brockville, Canada

[73] Assignee: Defelsko Corporation, Ogdensburg, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/529,137

[22] Filed: Sep. 15, 1995

[51] Int. Cl.⁶ .......................... G06F 15/52; G01N 23/203
[52] U.S. Cl. .......................... 702/170; 702/155; 324/229; 324/230
[58] Field of Search ................. 364/563, 560, 364/550, 920, 921.8; 324/230, 229; 702/155, 170

[56] References Cited

U.S. PATENT DOCUMENTS

| | | | |
|---|---|---|---|
| 4,046,994 | 9/1977 | Prohaska | 235/61.11 A |
| 4,059,904 | 11/1977 | Sato | 33/126.7 A |
| 4,079,237 | 3/1978 | Schlesinger | 364/563 |
| 4,155,009 | 5/1979 | Lieber et al. | 250/308 |
| 4,266,875 | 5/1981 | Bodlaj | 356/381 |
| 4,389,706 | 6/1983 | Gomola et al. | 364/130 |
| 4,715,007 | 12/1987 | Fujita | 364/563 |
| 4,742,879 | 5/1988 | Leifeld | 177/50 |
| 4,791,706 | 12/1988 | Wiening et al. | 19/105 |
| 4,863,037 | 9/1989 | Stevens et al. | 209/3.1 |
| 4,919,967 | 4/1990 | Handke et al. | 427/8 |
| 4,934,309 | 6/1990 | Ledermann et al. | 118/50 |
| 4,962,569 | 10/1990 | Hösel | 19/106 R |
| 4,967,381 | 10/1990 | Lane et al. | 364/551.01 |
| 4,974,166 | 11/1990 | Maey et al. | 364/478 |
| 4,982,477 | 1/1991 | Hösel | 19/0.25 |
| 5,054,620 | 10/1991 | DeWitt et al. | 209/3.1 |
| 5,054,700 | 10/1991 | DeWitt | 241/101.4 |
| 5,066,241 | 11/1991 | Hills | 439/260 |
| 5,097,421 | 3/1992 | Maney et al. | 364/478 |
| 5,115,918 | 5/1992 | DeWitt et al. | 209/3.1 |
| 5,137,661 | 8/1992 | Kanome et al. | 264/1.3 |
| 5,165,415 | 11/1992 | Wallace et al. | 128/661.06 |
| 5,233,727 | 8/1993 | Baechler | 19/300 |
| 5,241,280 | 8/1993 | Aidun et al. | 324/671 |
| 5,254,830 | 10/1993 | Zarowin et al. | 219/121.43 |
| 5,293,132 | 3/1994 | Koch | 324/671 |
| 5,335,066 | 8/1994 | Yamada et al. | 356/364 |
| 5,343,146 | 8/1994 | Koch et al. | 324/230 |
| 5,467,014 | 11/1995 | Nix | 324/230 |

FOREIGN PATENT DOCUMENTS

| | | |
|---|---|---|
| 5-185367 | 7/1993 | Japan . |
| 2 265 985 | 10/1993 | United Kingdom . |
| WO 87/04783 | 8/1987 | WIPO . |
| WO 89/03020 | 4/1989 | WIPO . |
| WO 90/02920 | 3/1990 | WIPO . |

OTHER PUBLICATIONS

Personal Computer Memory Card International Association *PCMCIA PC Card Standard,* pp. i through xii, 1–3 through 1–4, 2–1 through 2–4, 3–1 through 3–28, 4–1 through 4–4, Release 2.1, Jul. 1993.

*Primary Examiner*—Emanuel T. Voeltz
*Assistant Examiner*—Hien Vo
*Attorney, Agent, or Firm*—Burns, Doane, Swecker & Mathis, LLP

[57] ABSTRACT

A modular coating thickness gauge includes a probe which generates a signal representative of coating thickness, a PCMCIA card connected to the probe for converting the signal into a standard PCMCIA output format, and a portable computing unit for receiving the signal via the PCMCIA card. The gauge allows the on-site user to alternately record coating thickness measurement data and descriptive textual or graphical data relating to each coating thickness measurement.

30 Claims, 5 Drawing Sheets

COATING THICKNESS GAUGE

BACKGROUND

1. Field of the Invention

The present invention relates to coating thickness gauges and more particularly to a novel method and apparatus for measuring and recording coating thickness data and associated descriptive data through a graphical user interface.

2. Description of the Related Art

The art of measuring the thickness of a coating on a substrate has produced a wide variety of coating thickness gauges for measuring a variety of materials. In general, coating thickness gauges include a probe which produces an electronic signal responsive to a measured physical quantity representative of a coating thickness. For example, when measuring the thickness of an electrically nonconductive coating on a conductive substrate, the probe can include an inductor which registers a change in impedance based on its proximity to the conductive substrate. The impedance change of the inductor is reflected by a change in frequency in an LC oscillator which can be mathematically related to the thickness of the coating.

Conventional coating thickness gauges have also provided the capability of transforming the electronic signal representative of coating thickness into digital data and of storing a number of data points for later downloading and analysis. Typically, the coating thickness measurements are later sequentially correlated to a written description of the article being measured. Such a procedure, however, requires the user to manually keep track of which data points correspond to which locations on the object being measured, and are thus time consuming and susceptible to recording errors.

Thus, although coating thickness gauges have been developed to provide very accurate digital readings, the industry has not yet produced a coating thickness gauge with a user interface which facilitates recording and analysis of data, despite the ongoing advances in computer technology. Prior to the present invention, there was a need in the art, therefore, for a method and apparatus for measuring and recording coating thickness data which is easy to use and which ensures accuracy and reliability in the recording of measurements.

OBJECTS AND SUMMARY

It is an object of the invention to provide a novel coating thickness gauge which allows a user to record thickness measurement data along with descriptive data through a user interface on a computer screen.

It is a further object of the invention to improve the accuracy of coating thickness measurement data by providing an apparatus which allows a user to alternate between recording a coating thickness measurement data point and recording descriptive textual or graphical data relating to the data point.

It is a further object of the invention to provide a modularized coating thickness apparatus which includes a probe which produces an electric signal representative of a measured coating thickness and a PCMCIA card which receives the electric signal and converts the electric signal into a digital data signal in a standard PCMCIA output format. The coating thickness apparatus preferably includes a portable computing unit or Personal Digital Assistant (PDA) with a port for receiving the PCMCIA card and a screen for providing a graphical user interface.

An exemplary method according to the present invention includes the steps of obtaining a plurality of coating thickness values with a probe electrically connected to an electronic memory, recording in the electronic memory the plurality of coating thickness values, and recording in the electronic memory a plurality of descriptive data units, each descriptive data unit being associated with one of the coating thickness values and defined, for example, with reference to an electronic pictorial representation of the coated article. The steps of recording the coating thickness values and of recording the descriptive data units may be performed alternately.

Exemplary embodiments of the invention provide the on-site user with the power of a personal computer together with an easy-to-use interface that does not require a keyboard. Among other advantages, the gauge improves the accuracy and reliability of coating thickness measurements, provides the flexibility of plugging in any probe (e.g., magnetic, eddy current, ultrasonic, etc.) to any PCMCIA-compatible device, and allows the user to perform data analysis on-site.

BRIEF DESCRIPTION OF THE DRAWINGS

The foregoing and other objects, features and advantages of the present invention will be more readily understood upon reading the following detailed description in conjunction with the drawings in which.

DETAILED DESCRIPTION OF THE PREFERRED EMBODIMENTS

Figure 1:
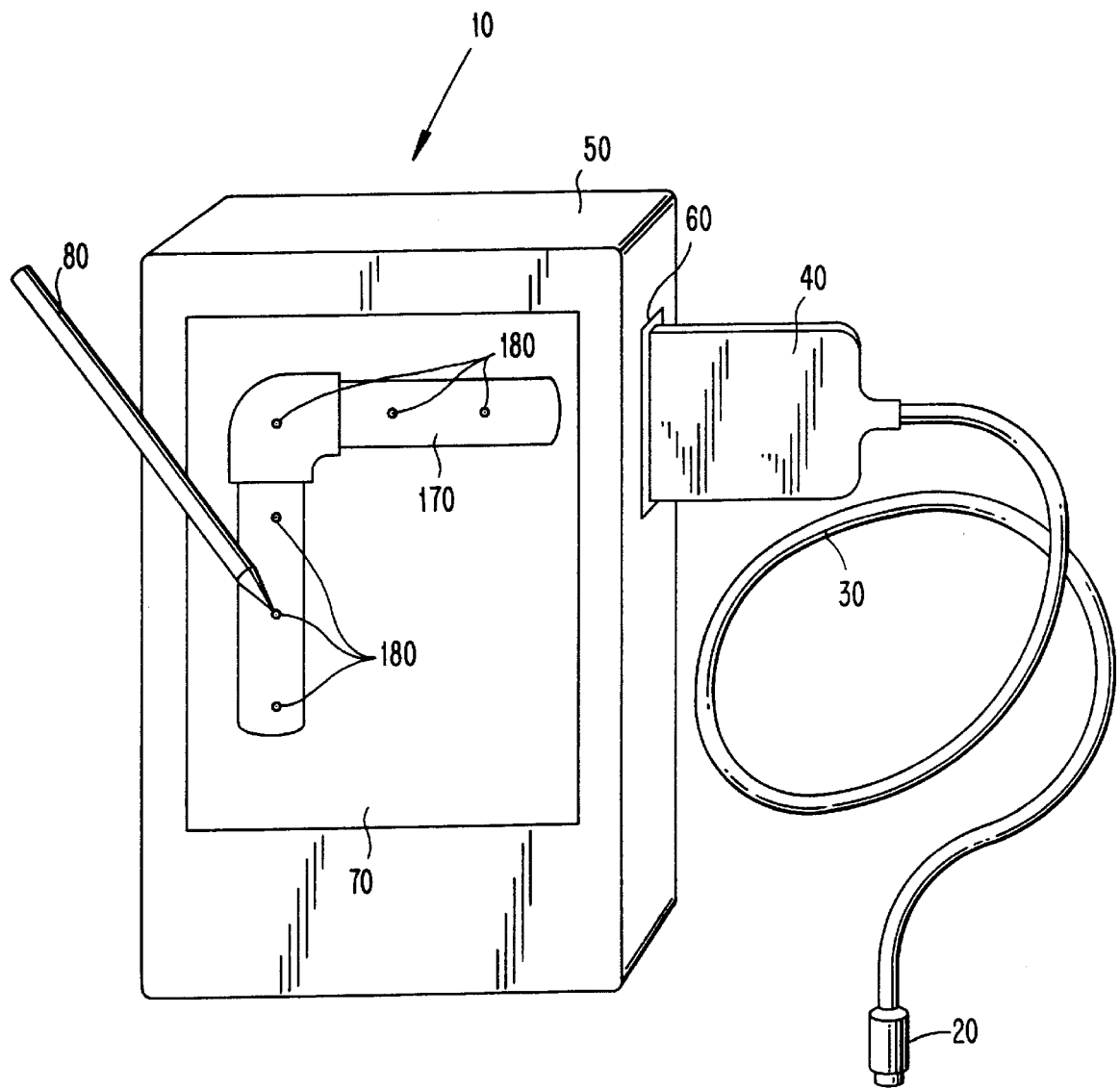
FIG. 1 is a perspective view of a coating thickness gauge according to an exemplary embodiment of the invention.

FIG. 1 is a perspective view of a coating thickness gauge according to an exemplary embodiment of the invention. The portable gauge 10 comprises a probe 20 connected by a cable 30 to an interface unit 40 such as a Personal Computer Memory Card International Association (PCMCIA) card. The PCMCIA card 40 is adapted to communicate with a portable computing unit 50 via a port 60. The portable computing unit 50 is small enough to be held comfortably in the palm of one's hand. However, it preferably includes a relatively large screen display 70 to provide a graphical interface to the user. The screen 70 is preferably, though not necessarily, a touch-sensitive screen which can be activated, for example, with an index finger or with any suitable pointed writing instrument 80. The portable computing unit 50 can be of the type generally known as a Personal Digital Assistant. The Apple NEWTON®, which provides a graphical user interface without a keyboard, is a preferred example of such a portable computing unit 50.

The PCMCIA card 40 can be adapted to support a wide variety of peripheral devices, and due to its versatility, allows virtually any type of probe 20 to be incorporated into the thickness gauge 10. For the purpose of illustration, two exemplary embodiments will now be described briefly in which a known type of probe 20 is implemented to measure the thickness of a coating on substrate. However, those skilled in the art will recognized that the PCMCIA card 40 can be adapted to support many other types of probes 20 in conjunction with the portable computing unit 50.

Figure 2:
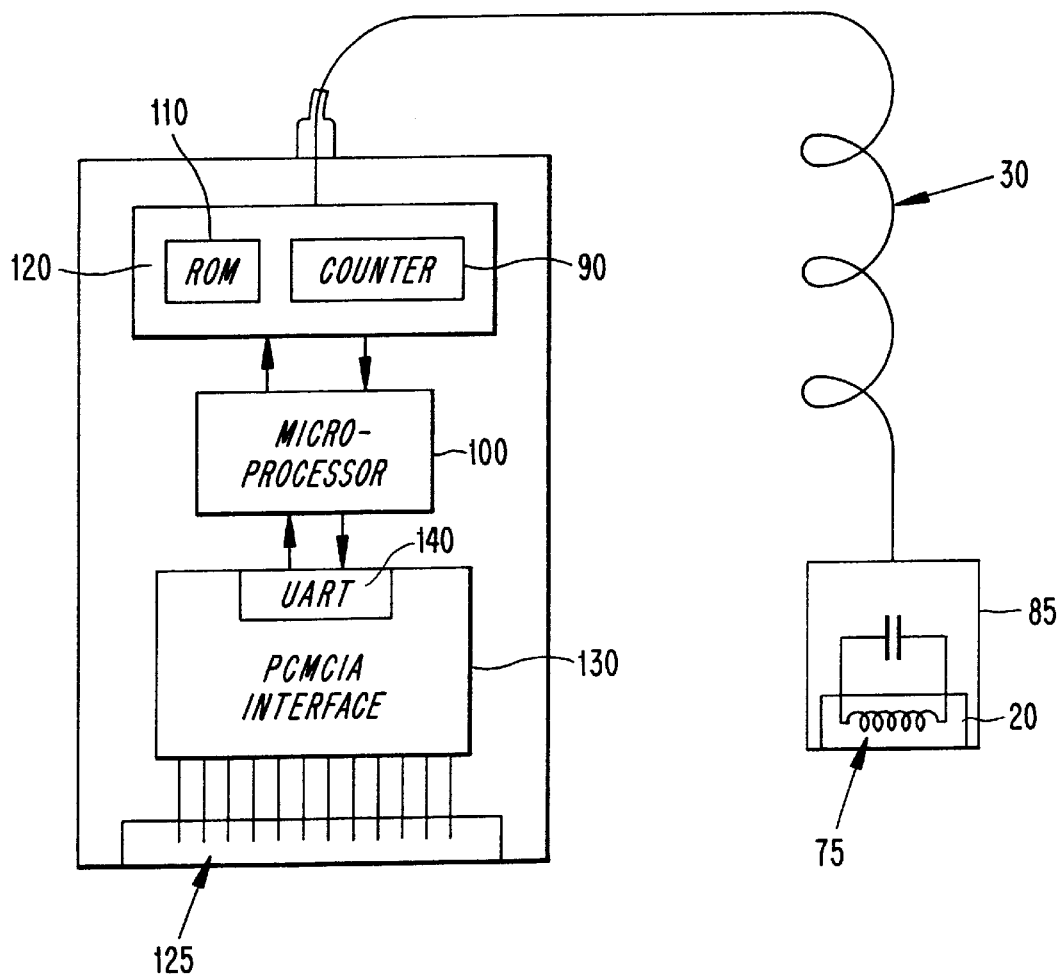
FIG. 2 is a schematic diagram of an exemplary PCMCIA card/probe unit.

According to one embodiment, as shown in FIG. 2 and as further described in commonly owned U.S. Pat. No. 5,293,132, entitled "Coating Thickness Measurement Gauge", which is hereby incorporated herein by reference, the probe 20 of the coating thickness gauge 10 can be the inductor 75 of an LC oscillator 85 of suitable, known type. The LC oscillator 85 allows for the measurement of the thickness of an electrically nonconductive coating on an electrically conductive substrate. The inductor 75 can be a simple air-core solenoid-type coil. The phrase "air-core" is meant to refer to a coil having a core made of nonmagnetic, nonmetallic material. In practice, the wire is wound around a nonmagnetic, nonmetallic rod. During measurement, a probe structure housing the probe is placed in contact with the surface of the coating such that the separation of the coil 75 and the electrically conductive substrate is a function of the geometry of the probe structure and the coating thickness.

The impedance of the coil 75 varies with its proximity to the electrically conductive substrate resulting in a corresponding variation in the oscillation frequency of the LC oscillator 85. This frequency is determined by a counter 90 which is used in conjunction with a microprocessor 100. For instance, a timing loop may be programmed into the microprocessor 100 such that it resets the counter 90 at the beginning of the timing loop and measures the period of time elapsed until a predetermined number of oscillations has occurred as indicated by an overflow signal. The number of measured oscillations should be large enough to achieve the desired accuracy.

Figure 3A:
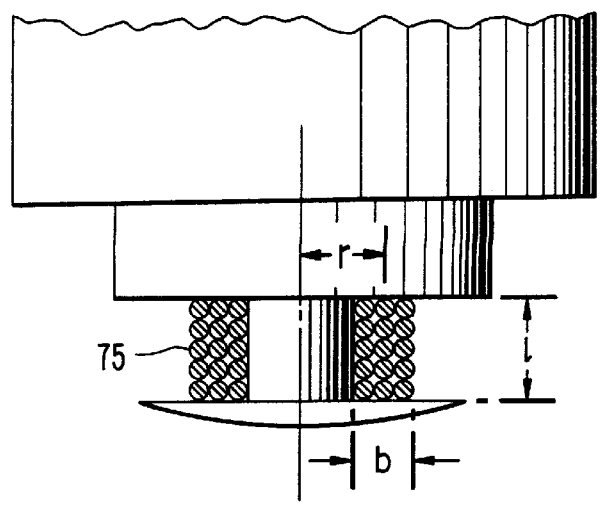
FIG. 3a is an enlarged view of a portion of a first exemplary probe assembly.

The relationship of the change in frequency of the oscillator 85 to the coating thickness is dependent on the particulars of the geometry of the probe assembly 20, shown in expanded detail in FIG. 3a. The most significant parameters affecting the relationship of the change in frequency to the coating thickness are the diameter r of the coil 75, the number of turns of the coil 75, the height I of the coil 75, the gauge of the wire as it affects the dimension b, and the material of the wound wire. Furthermore, the relationship is different depending on the material composition of the substrate. For a nonmagnetic substrate such as aluminum, the relationship may be approximated by the fourth-order polynomial:

$$Y = A_0 + A_1 F + A_2 F^2 + A_3 F^3 + A_4 F^4$$

where the coefficients $A_{0-4}$ are determined by the geometry of the probe 20 and the electrical characteristics of the substrate.

For a six-turn single layer wound coil using 26-gauge copper wire, the coefficients $A_{0-4}$ may be empirically determined and represented as follows for nonmagnetic aluminum substrates, with F representing the frequency change in KHz and Y representing the thickness in microns:

$$Y = 10090.44 - (26.965)F + (3.0195 \times 10^{-2})F^2 - (1.60 - 374 \times 10^{-5})F^3 + (+3.25473 \times 10^{-9})F^4$$

A complete set of coefficients $A_{0-4}$ can be stored in a ROM portion 110 associated with the microprocessor unit 100 during production of the thickness 10 gauge for any desired substrate material. For example, an additional set of coefficients $B_{0-4}$ can be stored for use with magnetic substrates. Thus, upon selection by the user of one of the substrate materials stored in memory, the coefficients associated with the selected substrate material can be recalled from the ROM 110 and employed along with the measured frequency change in the appropriate equation shown above for determining coating thickness.

Figure 3B:
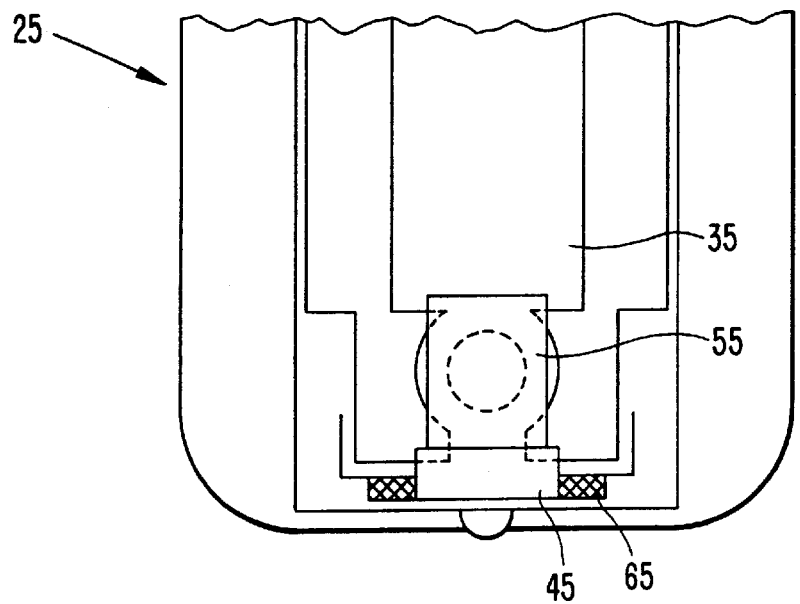
FIG. 3b is a diagram of a second exemplary probe assembly.

According to a second exemplary embodiment, a second gauge probe can be used in conjunction with the present invention to determine automatically, with a single probe, the substrate characteristics, and to effect a measurement of the coating thickness on that substrate. Such a probe is described for example in commonly owned U.S. Pat. No. 5,343,146, entitled "Combination Coating Thickness Gauge Using a Magnetic Flux Density Sensor and an Eddy Current Search Coil", which is hereby incorporated herein by reference. The probe tests for a ferrous substrate, measuring the temperature-compensated magnetic flux density at a pole of a permanent magnet using a Hall effect magnetic sensor and a thermistor. FIG. 3b shows a probe 25 which includes a permanent magnet 35, a Hall effect magnetic sensor 45, and a thermistor 55. The magnetic flux density and temperature measurements are converted into a temperature-compensated magnetic flux density value that is proportional to the coating thickness on the ferrous substrate. If no ferrous substrate is detected, the coating thickness gauge automatically switches over to test for a conductive nonferrous substrate, measuring the effects of eddy currents generated in the conductive nonferrous substrate by the coating thickness gauge magnetic fields using an eddy current search coil 65, as shown in FIG. 3b. The eddy current measurements are converted into an eddy current frequency value that is proportional to the coating thickness on the conductive nonferrous substrate.

Various other types of known probes may also be incorporated into the present invention, for example probes which measure coating thicknesses on ferrous substrates with a magnetic induction technique using two coils and a ferrous core. As discussed with regard to the first embodiment, the PCMCIA card 40 can be adapted to include hardware elements such as a counter or a ROM chip to support a desired coating thickness gauge probe. The gauge electronics 120 in FIG. 2 are thus intended to generally represent a capacity of the PCMCIA card 40 to include hardware elements to support any type of gauge probe. For example, as will be readily appreciated by those skilled in the art, the PCMCIA card 40 can be modified by one skilled in the art to include hardware to support probes which measure thicknesses of nonmagnetic coatings on ferrous substrates, nonconductive coatings on nonferrous substrates, combination probes which measure both, or probes which ultrasonically measure coating thicknesses on nonmetals.

In addition to the hardware support elements 120 included in the PCMCIA card 40 for a particular application, The PCMCIA card 40 also includes the microprocessor 100 and a PCMCIA interface 130 which creates a standardized communication path from the microprocessor 100 to the portable computing unit 50. Included in the PCMCIA interface 130 is a Universal Asynchronous Receiver Transmitter (UART) 140, an I/O device which sends and receives information in bit-serial fashion. The microprocessor 100, in conjunction with the supporting hardware 120, converts the signal from the probe 20 into a digital representation of a coating thickness which is transmitted through the UART 140 to the portable computing unit 50 in a standardized PCMCIA format. For brevity, the details of this process are omitted, as those skilled in the art are capable of adapting a particular signal to the PCMCIA format.

The physical attributes and internal operation of the PCMCIA card 40 are defined in detail by the Personal Computer Memory Card International Association, which updates the PCMCIA specifications periodically. The PCMCIA standard includes detailed specifications regarding the physical attributes of the card such as dimensions and mechanical tolerances, card interface information such as signal definitions for the connecting pins 125 of the PCMCIA card, and data organization on the card. Because the PCMCIA card is a standard interface, the present invention provides a versatile coating thickness gauge which can be used in a wide variety of hardware environments.

Figure 4:
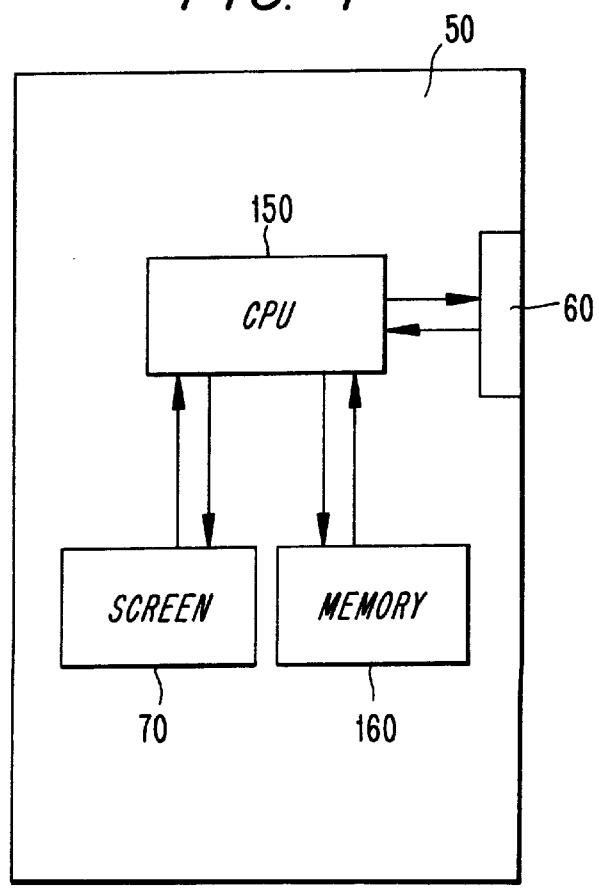
FIG. 4 is a schematic diagram of a portable computing unit.

The portable computing unit 50 receives the PCMCIA card 40 via a port 60 to communicate with the probe 20. The portable computing unit 50 includes, among other elements, a microprocessor 150 for controlling the operations of the coating thickness gauge 10. See FIG. 4. The portable computing unit 50 can be programmed, for example, to automatically recognize the type of probe which is connected to the portable computing unit 50. The microprocessor 150 is associated with a memory 160 which can store computer programs which control the operation of the gauge 10. The microprocessor 150 exchanges data with the memory 160 and with the user via the screen 70 which is large enough to provide a graphical interface for the user. The versatility provided by the memory 160, the microprocessor 150, the large screen 70, and the standard PCMCIA interface thus provide the coating thickness gauge 10 of the present invention with many important advantages. Exemplary embodiments of the invention, for example, provide the user with the ability to perform complete data analysis or statistical process control on-site, the flexibility of using any probe with any PCMCIA-compatible portable computing unit 50, and the capability of providing a sophisticated user interface which allows the user to easily annotate coating thickness measurements with descriptive textual and graphical data.

According to one exemplary method of the invention, a user of the gauge 10 alternates between recording a thickness measurement reading with the probe 20 and entering descriptive data via the screen 70. The descriptive data can be entered in a number of ways. For example, a virtual typewriter keyboard can be graphically simulated on the screen 70 for entry of descriptive comments relating to a particular thickness measurement using an index finger or a pointed writing instrument 80. Alternatively, the portable computing unit 50 can be adapted to convert a handwritten image, created by handwriting on the screen with the writing instrument 80, into textual data. The process of converting a handwritten image of "electronic ink" or typed letters into digital textual data, which has been incorporated into the Apple NEWTON®, greatly facilitates the entry of descriptive data associated with a particular coating thickness measurement. The ability to label all or selective individual data points with descriptive text also enhances the reliability of the measured coating thickness data by ensuring that data points are properly labeled and by allowing the user to immediately record any abnormalities as measurements are taken.

According to a further exemplary method, a two- or three-dimensional image of the object to be measured can be created on the screen 70 by the user as a reference for input coating thickness data points. According to this method, a user first recalls or sketches a diagram of the object to be measured on the screen 70 of the portable computing unit 50 using the writing instrument 80. This process can be facilitated with a program, included in the Apple NEWTON, which transforms user-created images into various geometrical forms such as rectangles and circles. The drawing is then stored in the memory 160 as a reference for the measured thickness values. As coating thickness values are obtained with the probe 20, the user identifies, with reference to the screen drawing, the locations on the object at which the coating thickness values were obtained. In addition, the user can input for any coating thickness value, a textual description relating to the measured data point. FIG. 1 is an example which depicts a drawing of a coated pipe 170 which a user would measure to obtain coating thickness values at various locations. After taking a measurement of the actual pipe with the probe 20, the user simply indicates the location of the data point with reference to the pictorial representation on the screen 70 using the writing instrument. The screen thus serves as a graphical interface to record the location of data points 180, as shown in FIG. 1.

Figure 5:
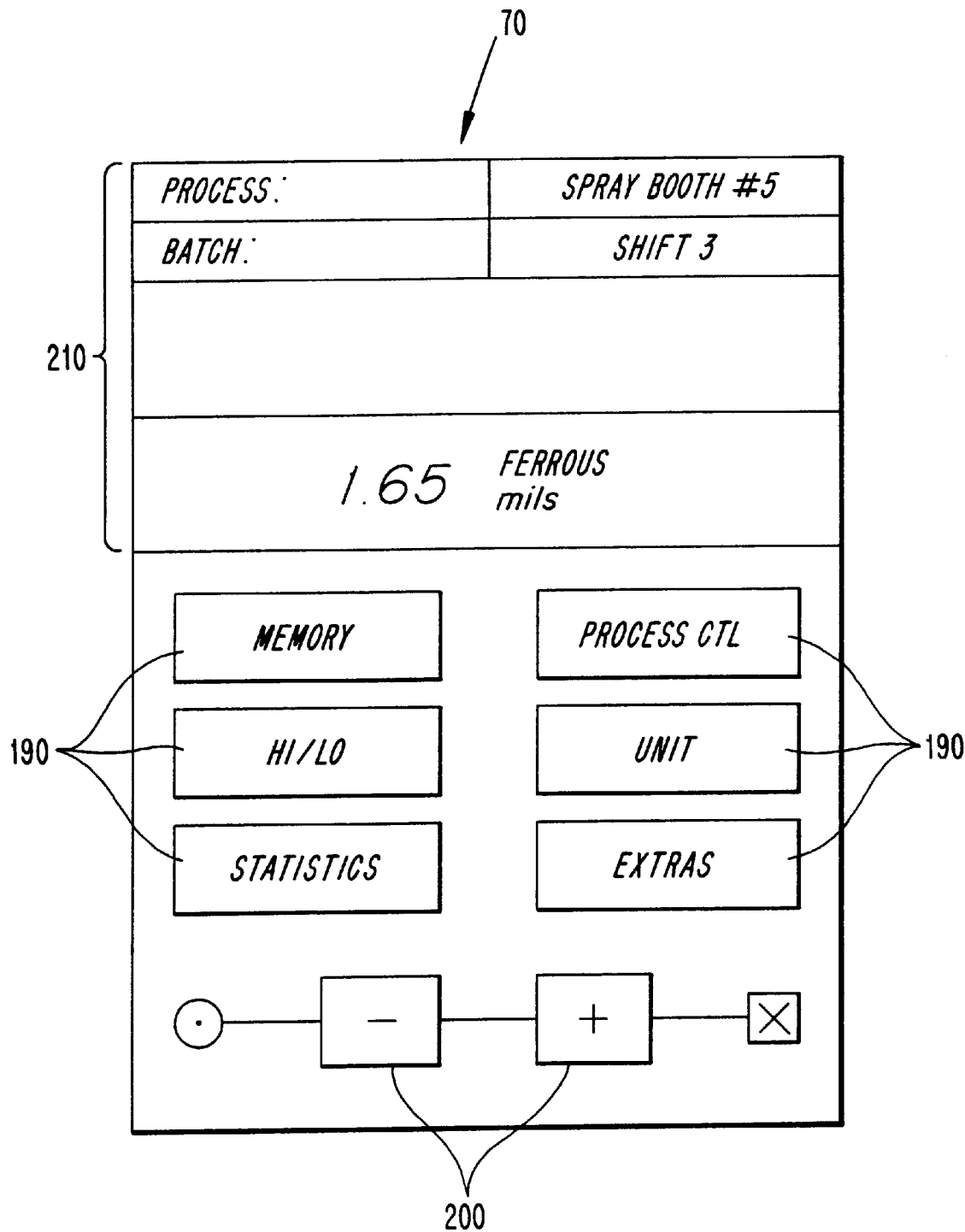
FIG. 5 is a diagram of an exemplary control display on the portable computing unit.

The large touch-sensitive screen 70 of the portable computing unit 50 can be further adapted to facilitate operation of the coating thickness gauge 10 with a number of virtual buttons. As shown in FIG. 5, the screen 70 can include several virtual buttons 190 which, for example, allow the user to enter a memory mode to begin storing thickness measurements, enter high and low tolerance limits, command the gauge to compute and display statistics on the data thus obtained, enter parameters specifying a particular process used in applying a coating, specify units for the coating thickness readings, or any other desired function. The process control button can be used for, among other functions, labeling any batch with a particular process used in coating. This feature facilitates data analysis by allowing the user to analyze a group of batches associated with the same coating process. Calibration buttons 200 are provided to calibrate the gauge when a reading differs from a known thickness.

At the top of the screen 70, a display section 210 may be provided which displays thickness readings with units, an indicator of whether a ferrous or nonferrous material was measured, a textual description of a particular batch, and a label for a particular process used in coating. The screen 70 shown in FIG. 5 is of course intended to provide an example illustrating the versatility of one embodiment of an exemplary coating thickness gauge. It will be readily appreciated by those skilled in the art, however, that many modifications in the screen interface can be affected without departing from the scope of the invention.

Figure 6:
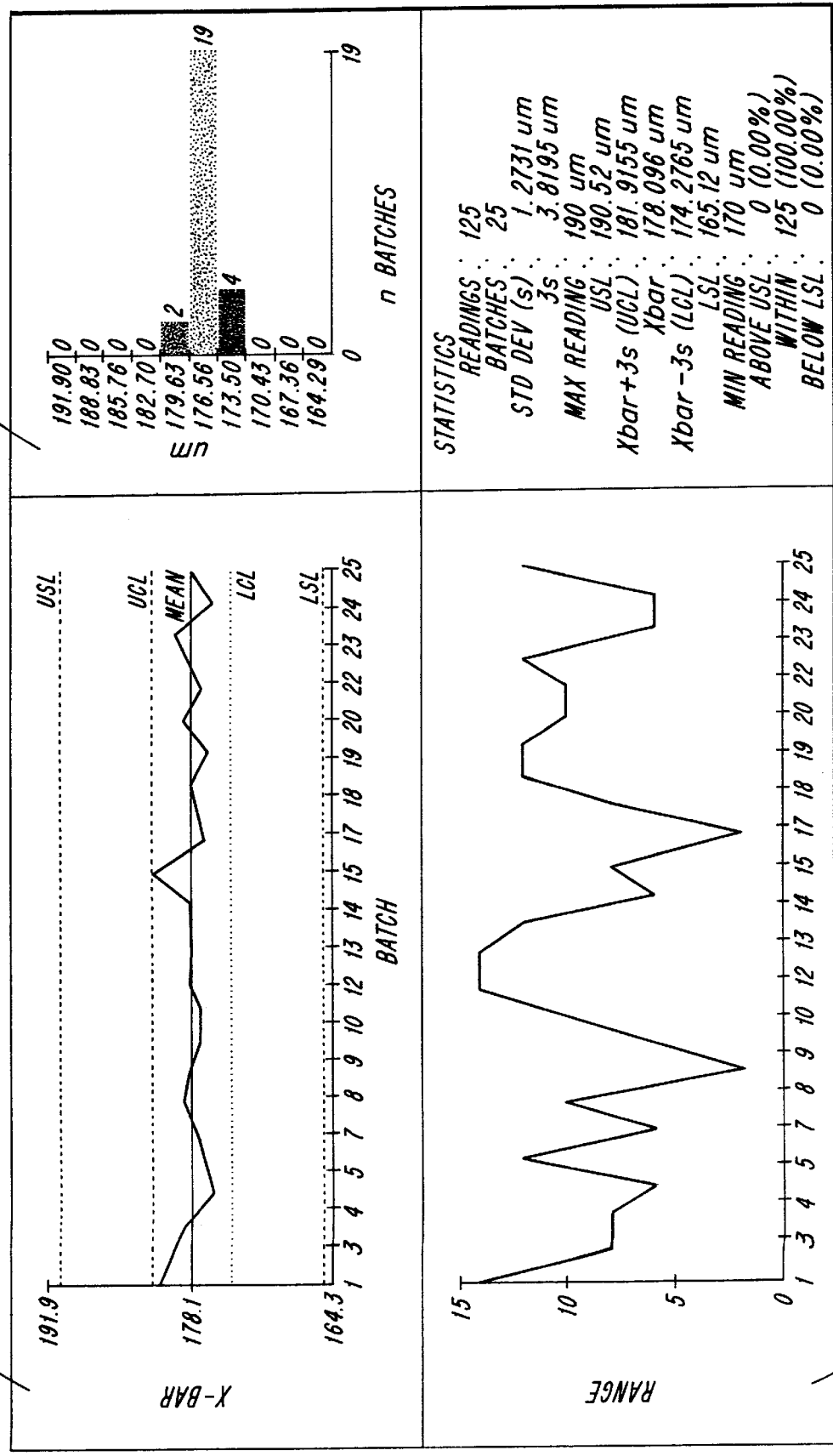
FIG. 6 is a diagram of an exemplary output display on the portable computing unit.

The screen 70 can also be adapted to provide graphical output, which advantageously allows the on-site user to use statistical process control in analyzing coating thickness measurements. FIG. 6 shows an exemplary output screen which includes graphs 220 and 230 of x-bar and range for a set of batches, a histogram 240, and a list of desired statistics 250 for the stored readings. The x-bar graph 220 shows on the screen 70 a computed average thickness value for each batch. The range graph 230 shows a computed difference in thickness between the greatest and least measured thickness in a particular batch. These graphs thus allow the user to easily monitor any anomalies or trends in the coating process. Moreover, according to an exemplary embodiment of the invention, the user can access any annotations or other descriptive data associated with a batch or thickness measurement simply by touching the displayed batch number, data point, or other indicia on the screen 70 with the writing instrument 80. This capability allows the user to determine, for example, whether anomalies illustrated in the output graphs are associated with any anomalies described in annotations recorded during measurement.

The histogram 240 provides an additional visual indicator of the consistency of recorded coating thickness measurements. The list of statistics 250 can include, among other parameters, a standard deviation calculated from measurements of selected batches, a maximum and a minimum reading, upper and lower set limits (USL, LSL) set by the user, and upper and lower control limits (UCL, LCL) which represent the average thickness plus or minus three standard deviations. Like the screen of FIG. 5, the output screen in FIG. 6 is, of course, intended to show one embodiment which may be modified, for example, to accommodate other statistical process control operations without departing from the scope of the invention.

The present coating thickness gauge according to exemplary embodiments of the invention thus provides many important advantages in obtaining coating thickness measurement data. By combining a portable computing unit such as a Personal Digital Assistant with a coating thickness gauge probe via a PCMCIA interface, the invention greatly enhances the computing options available for obtaining and processing coating thickness measurements on-site. Thus, the user may perform data analysis, enter descriptive comments, control the gauge with icons, and generally harness the power of a large display, resident software, and regular upgrades of the portable computing unit. Moreover, these advantages are provided in a coating thickness gauge which is substantially less expensive to manufacture than commercially available gauges.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method of recording coating thickness measurements, comprising the steps of:
   obtaining a plurality of coating thickness values with a probe electrically connected to an electronic memory;
   recording in the electronic memory the plurality of coating thickness values; and
   recording in the electronic memory a plurality of descriptive data, each descriptive data is associated with a respective one of the coating thickness values and provides information concerning the respective one coating thickness value.

2. The method of claim 1, wherein the steps of recording the coating thickness values and of recording the descriptive data are performed alternately.

3. The method of claim 1, wherein the coating thickness values are transmitted to the electronic memory via a PCMCIA card.

4. The method of claim 1, wherein the descriptive data comprise text.

5. The method of claim 1, wherein the descriptive data are recorded by transforming text handwritten on a computer screen with a writing instrument into digital data.

6. The method of claim 1, wherein the descriptive data are defined with reference to an electronic pictorial representation of a coated article.

7. The method of claim 6, wherein the descriptive data represent locations on the electronic pictorial representation of the coated article.

8. The method of claim 1, further comprising the step of displaying a plurality of indicia on a graph on a video display screen, the indicia representing the plurality of coating thickness values.

9. The method of claim 8, further comprising the step of retrieving one of the descriptive data by selecting on the graph one of the indicia.

10. An apparatus for measuring a coating thickness, comprising:
    a probe which generates a first signal representative of a measured coating thickness; and
    a PCMCIA card connected to the probe and which receives the first signal from the probe, the PCMCIA card including means for converting the first signal into a second signal which is compatible with a standard PCMCIA output format.

11. The apparatus of claim 10, wherein the probe comprises an LC oscillator.

12. The apparatus of claim 11, wherein the PCMCIA card includes a counter which measures a frequency of the LC oscillator.

13. The apparatus of claim 10, wherein the probe comprises a permanent magnet and a Hall sensor.

14. The apparatus of claim 13, wherein the probe further comprises an eddy current search coil.

15. The apparatus of claim 10, wherein the probe includes means for discriminating between a ferrous and a nonferrous substrate upon which the coating is coated.

16. The apparatus of claim 10, further comprising a portable computing unit which includes a PCMCIA port for receiving the PCMCIA card.

17. The apparatus of claim 16, wherein the portable computing unit includes a touch-sensitive screen, and the portable computing unit receives descriptive data from a user via the screen.

18. The apparatus of claim 17, further comprising a pointed writing instrument for entering the descriptive data.

19. The apparatus of claim 17, wherein the portable computing unit comprises a memory and is adapted to alternately record in the memory the descriptive data from the user and numerical data from the second signal which numerical data represent a coating thickness.

20. The apparatus of claim 19, wherein the descriptive data are defined with reference to a pictorial representation on the screen of an article upon which a coating is coated.

21. An apparatus for measuring and recording coating thickness measurements, comprising:
    an electronic memory;
    means for obtaining a plurality of coating thickness values with a probe electrically connected to the electronic memory;
    means for recording in the electronic memory the plurality of coating thickness values; and
    means for recording in the electronic memory a plurality of descriptive data so that each descriptive data is associated with a respective one of the coating thickness values and provides information concerning the respective one coating thickness value.

22. The apparatus of claim 21, wherein the coating thickness values are transmitted to the electronic memory via a PCMCIA card.

23. The method of claim 1, wherein the descriptive data includes textual descriptions of the associated coating thickness values.

24. The method of claim 1, wherein the descriptive data includes an image of an object measured to obtain the plurality of coating thickness values.

25. The method of claim 1, wherein the descriptive data provides a description of a source of the coating thickness values.

26. The apparatus of claim 21, wherein the descriptive data includes textual descriptions of the associated coating thickness values.

27. The apparatus of claim 21, wherein the descriptive data includes an image of an object measured to obtain the plurality of coating thickness values.

28. The apparatus of claim 21, wherein the descriptive data provides a description of a source of the coating thickness values.

29. The method of claim 1, further comprising the step of inputting the plurality of descriptive data via an input device prior to recording the plurality of descriptive data.

30. The apparatus of claim 21, further comprising means for inputting the plurality of descriptive data.

* * * * *